US011150379B2

(12) United States Patent  (10) Patent No.: US 11,150,379 B2
Phillips et al.  (45) Date of Patent: *Oct. 19, 2021

(54) WEATHER FORECASTING USING SATELLITE DATA AND MOBILE-SENSOR DATA FROM MOBILE DEVICES

(71) Applicant: Google Technology Holdings LLC, Mountain View, CA (US)

(72) Inventors: Derek Phillips, Ontario, CA (US); Ian M. Robertson, Waterloo, CA (US)

(73) Assignee: Google LLC, Mountain View, GA (US)

( * ) Notice: Subject to any disclaimer, the term of this patent is extended or adjusted under 35 U.S.C. 154(b) by 601 days.

This patent is subject to a terminal disclaimer.

(21) Appl. No.: 16/115,329

(22) Filed: Aug. 28, 2018

(65) Prior Publication Data

US 2018/0364394 A1  Dec. 20, 2018

Related U.S. Application Data

(63) Continuation of application No. 14/525,815, filed on Oct. 28, 2014, now Pat. No. 10,088,601.

(51) Int. Cl.
*G01W 1/10* (2006.01)
*G01W 1/00* (2006.01)

(52) U.S. Cl.
CPC ........ *G01W 1/10* (2013.01); *G01W 2001/006* (2013.01)

(58) Field of Classification Search
CPC ............. G01W 1/10; G01W 2001/006; G01W 2203/00; G06N 20/00
See application file for complete search history.

(56) References Cited

U.S. PATENT DOCUMENTS

| 5,850,619 | A | * | 12/1998 | Rasmussen | G01W 1/14 702/3 |
| 6,128,578 | A | * | 10/2000 | Sakaino | G06T 7/246 702/3 |
| 6,728,552 | B2 | * | 4/2004 | Chatain | G01W 1/02 455/556.1 |
| 7,069,258 | B1 | * | 6/2006 | Bothwell | G01W 1/10 706/12 |

(Continued)

FOREIGN PATENT DOCUMENTS

JP  06230146 A  *  8/1994

OTHER PUBLICATIONS

"Final Office Action", U.S. Appl. No. 14/525,815, dated Nov. 15, 2017, 14 pages.

(Continued)

*Primary Examiner* — Paulinho E Smith
(74) *Attorney, Agent, or Firm* — Colby Nipper PLLC

(57) ABSTRACT

Techniques and apparatuses for improved weather forecasting using satellite data are described in this publication. The conventional predictions that are utilized for the generation of weather forecasts are commonly based on large-scale weather formations. Such formations are typically directed to large geographical regions of a state, province, or country, and thus may not be accurate for smaller geographical regions. The disclosed techniques and apparatuses utilize satellite data for a macro-location, and mobile-sensor data from mobile devices within that macro-location, to provide improved macro-location weather forecasting.

20 Claims, 10 Drawing Sheets

(56) References Cited

U.S. PATENT DOCUMENTS

| | | | | |
|---|---|---|---|---|
| 7,212,922 | B1* | 5/2007 | Longacre | G01W 1/10 702/3 |
| 7,774,139 | B1* | 8/2010 | Rose | G01W 1/02 702/3 |
| 8,463,071 | B2 | 6/2013 | Snavely et al. | |
| 8,818,029 | B1* | 8/2014 | Mecikalski | G01W 1/10 382/103 |
| 8,854,219 | B2* | 10/2014 | Assuncao | G01W 1/10 340/601 |
| 9,772,428 | B2* | 9/2017 | Asrani | G01W 1/10 |
| 10,088,601 | B2* | 10/2018 | Phillips | G01W 1/10 |
| 2002/0092965 | A1* | 7/2002 | Addink | G01W 1/10 250/203.4 |
| 2003/0182259 | A1* | 9/2003 | Pickett | G06Q 10/06 |
| 2005/0222771 | A1* | 10/2005 | Matsumoto | G01W 1/10 702/3 |
| 2010/0198420 | A1* | 8/2010 | Rettger | H02S 10/00 700/291 |
| 2010/0274542 | A1* | 10/2010 | Krupansky | G01W 1/10 703/6 |
| 2011/0004511 | A1* | 1/2011 | Reich | G06Q 30/0261 705/14.1 |
| 2011/0060475 | A1* | 3/2011 | Baldwin | H01L 31/02021 700/295 |
| 2012/0016892 | A1 | 1/2012 | Wang et al. | |
| 2012/0065783 | A1* | 3/2012 | Fadell | F24F 11/62 700/276 |
| 2012/0270566 | A1* | 10/2012 | Persson | G01C 5/06 455/456.3 |
| 2012/0316455 | A1* | 12/2012 | Rahman | G01C 22/006 600/547 |
| 2013/0204451 | A1* | 8/2013 | Staehle | G06F 1/26 700/291 |
| 2013/0294657 | A1 | 11/2013 | Chen | |
| 2013/0338839 | A1* | 12/2013 | Rogers | G05D 23/1902 700/278 |
| 2014/0058572 | A1* | 2/2014 | Stein | H02J 13/00004 700/291 |
| 2014/0067733 | A1* | 3/2014 | Humann | G06N 20/00 706/12 |
| 2014/0135040 | A1* | 5/2014 | Edge | G01C 5/06 455/456.6 |
| 2014/0136089 | A1* | 5/2014 | Hranac | G08G 1/096775 701/118 |
| 2014/0324351 | A1* | 10/2014 | Dannevik | G01W 1/00 702/3 |
| 2014/0372039 | A1* | 12/2014 | Leblanc | G01W 1/10 702/3 |
| 2014/0372360 | A1* | 12/2014 | Asrani | G01W 1/10 706/47 |
| 2015/0095830 | A1* | 4/2015 | Massoumi | G06F 3/04842 715/771 |
| 2015/0134798 | A1* | 5/2015 | Tofighbakhsh | H04W 12/02 709/223 |
| 2015/0160372 | A1* | 6/2015 | Liang | H04W 4/02 702/3 |
| 2015/0178865 | A1* | 6/2015 | Anderson | G05B 17/02 705/7.25 |
| 2015/0198452 | A1 | 7/2015 | Gupta et al. | |
| 2015/0198738 | A1* | 7/2015 | Gupta | G01W 1/10 702/3 |
| 2015/0212236 | A1* | 7/2015 | Haas | G06T 7/337 382/100 |
| 2015/0362624 | A1* | 12/2015 | Wada | G01W 1/00 702/3 |
| 2016/0019560 | A1* | 1/2016 | Benkert | G06Q 30/0201 700/284 |
| 2016/0116640 | A1* | 4/2016 | Phillips | G01W 1/10 702/3 |
| 2016/0334123 | A1* | 11/2016 | Humann | G06N 20/00 |
| 2016/0349408 | A1* | 12/2016 | Suits | G01W 1/10 |
| 2019/0025462 | A1* | 1/2019 | Reichmuth | H04W 4/021 |

OTHER PUBLICATIONS

"Non-Final Office Action", U.S. Appl. No. 14/525,815, dated Feb. 22, 2018, 6 pages.

"Notice of Allowance", U.S. Appl. No. 14/525,815, dated Jun. 27, 2018, 5 pages.

"Pre-Interview Communication", U.S. Appl. No. 14/525,815, dated Jul. 14, 2017, 5 pages.

* cited by examiner

WEATHER FORECASTING USING SATELLITE DATA AND MOBILE-SENSOR DATA FROM MOBILE DEVICES

RELATED APPLICATION

This application claims priority and is a continuation of U.S. Utility patent application Ser. No. 14/525,815, filed on Oct. 28, 2014, which is incorporated herein by reference in its entirety.

BACKGROUND

Currently, many users plan their day based on weather forecasts, such as what clothes to wear and what activities to do. These forecasts, however, have varied success at predicting weather, as many forecasts indicate that it will rain but it does not, that there will be a 15 mile-per-hour wind when it ends up being 30 miles-per-hour, or that it will be mostly cloudy when it ends up being sunny. As anyone that has used these forecasts can attest, these forecasts are often wrong.

Further, meteorologists determining these weather forecasts commonly base their predictions on large-scale weather formations. Because of this, conventional forecasts are directed to large regions of a state, province, or country. Even when these predictions are accurate for a large region—which they often are not—small parts of those regions may have substantially different weather. It may, for example, be calm and sunny through most of a 1000-square-kilometer area but at a particular park be both windy and raining. If a user wishes to go to this park, such differences in weather can greatly affect his or her day, as the user will show up at the park expecting calm winds and sun and be greeted with both wind and rain.

SUMMARY

This disclosure describes techniques and apparatuses for weather forecasting using satellite data for a macro-location and mobile-sensor data from mobile devices within that macro-location. These techniques in some cases improve macro-location weather forecasting and, in some other cases, forecast micro-climates within the macro-location. With improved large-scale weather forecasting or these micro-climates, a user may better plan his or her day, including what to wear, which path to walk to work, and what activities to plan.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

Techniques and apparatuses for weather forecasting using satellite data and mobile-sensor data from mobile devices are described with reference to the following drawings. The same numbers are used throughout the drawings to reference like features and components.

DETAILED DESCRIPTION

Overview

Figure 1:
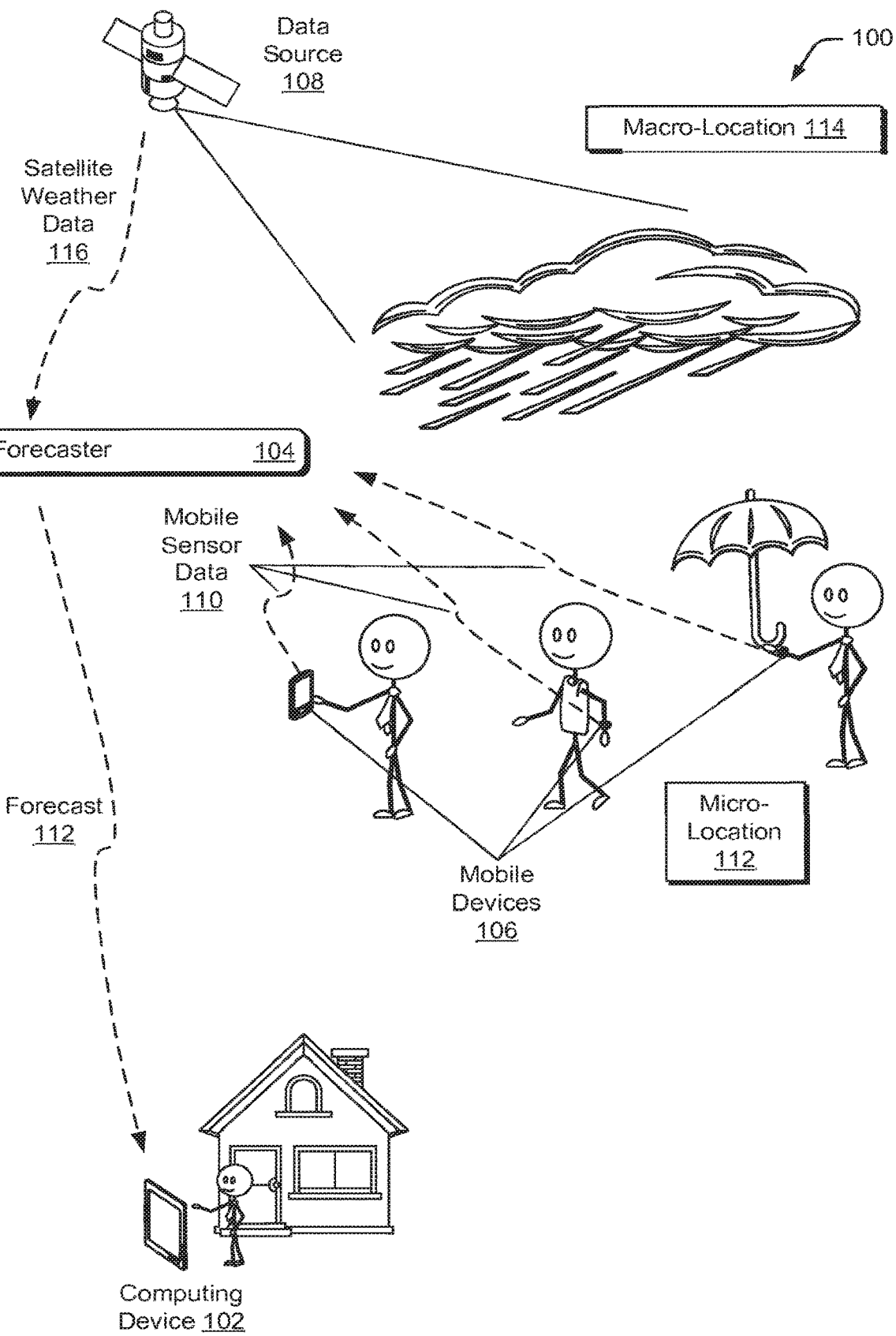
FIG. 1 illustrates an example environment in which techniques for weather forecasting using satellite data and mobile-sensor data from mobile devices can be implemented.

Current techniques for predicting weather conditions often fail to accurately forecast these conditions at macro-locations and, even more often, fail to accurately predict weather at micro-locations, such as the weather at a park, down a street, or in a sheltered bay. This disclosure describes techniques and apparatuses for weather forecasting using satellite data and mobile-sensor data from mobile devices to improve macro-location weather forecasting and provide micro-location forecasts that often vary within those macro-locations.

By way of example, consider a user that walks to a subway station on weekdays between 6:15 am and 6:30 am. Assume that the subway station is six blocks from his apailinent and that he typically walks two blocks directly south, then two blocks west, and then two more blocks south, at which time he arrives at the station. Currently, at 6:10 am when he is about to walk out the door, he checks the general weather forecast for his city. The forecast for this morning, between 6 am and 7 am, predicts a 10% chance of rain, winds five to ten kilometers an hour, temperature of ten degrees Celsius, and mostly cloudy. Based on this prediction, assume that the user would normally put a light jacket over his usual business attire and that he would forgo taking an umbrella, as the prediction for rain is only 10%.

In contrast, consider the same user aided by the techniques. Assume that the user still walks to the station between 6:15 am and 6:30 am. When he checks the weather at 6:10 am, however, assume that the techniques forecast micro-climates, which indicate with a high degree of accuracy and minute-to-minute current conditions, that the first two blocks of his walk are 12 degrees Celsius, winds are of five kilometers an hour, and that it is mostly cloudy. For the western two blocks of his walk, the techniques provide a micro-climate of ten degree Celsius, winds of 15 kilometers an hour, rain, and fully cloudy. For the last two blocks the techniques provide a micro-climate about the same as the first two blocks. At this point the user may decide to take his umbrella, as he has two blocks to walk in the rain, or a rain jacket with hood instead of his light jacket.

Furthermore, in some embodiments, the techniques map out an alternative route. In this example, the alternative route can be provided where east-prevailing winds and rain are blocked by large buildings (as they are in the southern portions of this user's walk). With this map, the user has up-to-the-minute micro-climates and alternatives by which to decide how to dress or even which way to walk to avoid the rain and wind.

Further still, the techniques can improve forecasting for macro-locations using satellite weather data and mobile-sensor data, thereby aiding users to plan their day even if they are not interested in micro-location forecasts.

The following discussion first describes an operating environment, followed by techniques that may be employed in this environment, an example user interface, and then proceeds with an example device.

Example Environment

FIG. 1 illustrates an example environment 100 in which techniques for weather forecasting using satellite data and mobile-sensor data from mobile devices can be implemented. Example environment 100 includes a computing device 102 associated with a user, a forecaster 104, multiple mobile devices 106, and satellite weather-data source 108 (data source 108).

Each of mobile devices 106 provides mobile-sensor data 110 to forecaster 104. This mobile-sensor data 110 is sensed at one or more micro-locations, such as micro-location 112, which is within a macro-location 114 (not shown to scale). Mobile-sensor data 110 may include many types of data, such as an audio recording, a mobile-device orientation, a movement read by an accelerometer, a device speed (e.g., from a user walking or running), an image or video recording of a camera, a pressure reading of a barometer, an ambient electrical charge, an on or off condition, or an effectiveness of a touch screen of one of the mobile devices. These will be described in greater detail below, as each may indicate certain weather conditions.

Forecaster 104 also receives satellite weather data 116 from data source 108, either directly or indirectly. Satellite weather data 116 includes current weather data for macro-location 114. This weather data can include locations of particular clouds, precipitation, and images, such as top-down cloud images showing various details, including type (cirrus, cirrostratus, cirrocumulus, cumulonimbus, cumulus, altostratus, altocumulus, stratocumulus, nimbostratus, and stratus), location (in three dimensions within a macro-location), status (raining, speed indicating wind, etc.), water content, color (dark, light, etc.). Other weather data may also be used and received that may not be sensed by a satellite, such as a temperature, barometric pressure, and so forth for macro-location 114.

Forecaster 104 then determines, based on the mobile-sensor data 110 and the satellite weather data 116, weather conditions at macro-location 114 and/or micro-location 112. Forecaster 104 may provide these forecasts to computer device 102, thereby permitting the user to know how best to prepare for his or day. Forecaster 104 is shown standing alone, but may be part of a server or other system, or integral with computing device 102. This discussion now turns to detailed examples of these elements starting with computing device 102.

Figure 2:
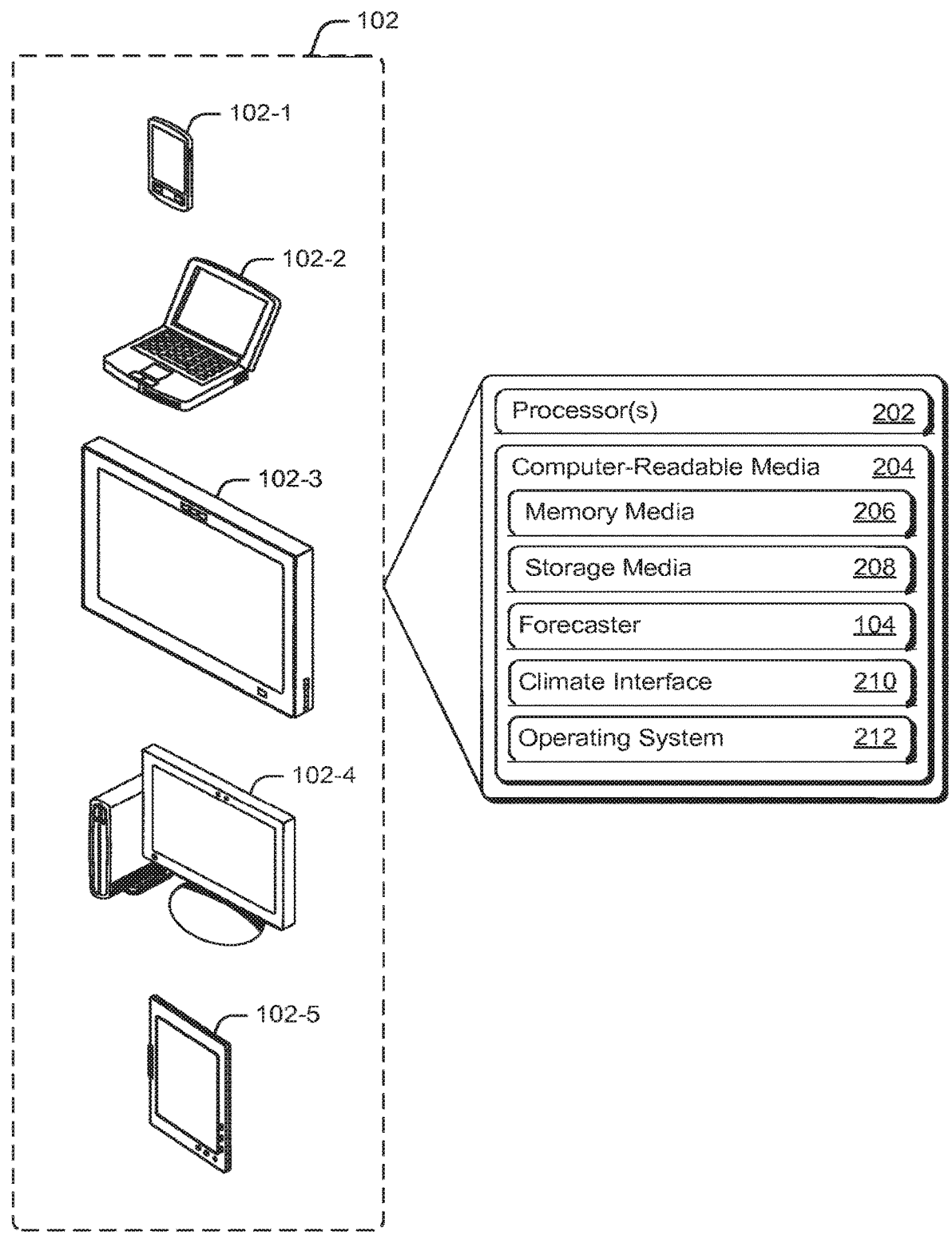
FIG. 2 illustrates a detailed example of the computing device of FIG. 1.

FIG. 2 illustrates a detailed example of computing device 102 having processor(s) 202 and computer-readable media 204, which includes memory media 206 and storage media 208. Computer-readable media 204 includes forecaster 104, climate interface 210, and operating system 212. Applications can be embodied as computer-readable instructions on memory media 206, which can be executed by processor(s) 202 to provide some or all of the functionalities described for computing device 102.

Generally, forecaster 104 is capable of forecasting, based on satellite weather data and mobile-sensor data, micro-climates for a micro-location and/or weather conditions for a macro-location. Ways in which forecaster 104 is implemented and used varies, and is described as part of methods discussed below.

Climate interface 210 is described in detail later in this document along with an example interface. In general, however, climate interface 210 provides micro-climates and associated micro-locations, or simply a warning of impending weather, to a user of computing device 102. In one example provided below, this climate interface 210 provides an alternative path to enable a user to avoid undesirable weather conditions.

Computing device 102 is illustrated, by way of example and not limitation, as one of a smart phone 102-1, laptop computer 102-2, television device 102-3, desktop computer 102-4, or tablet computer 102-5, though other devices may also be used, such as a smart watch, smart ring, home appliance (e.g., a refrigerator or smart home), smart glasses, netbooks, servers, and so forth. This discussion now turns to mobile device 106.

Figure 3:
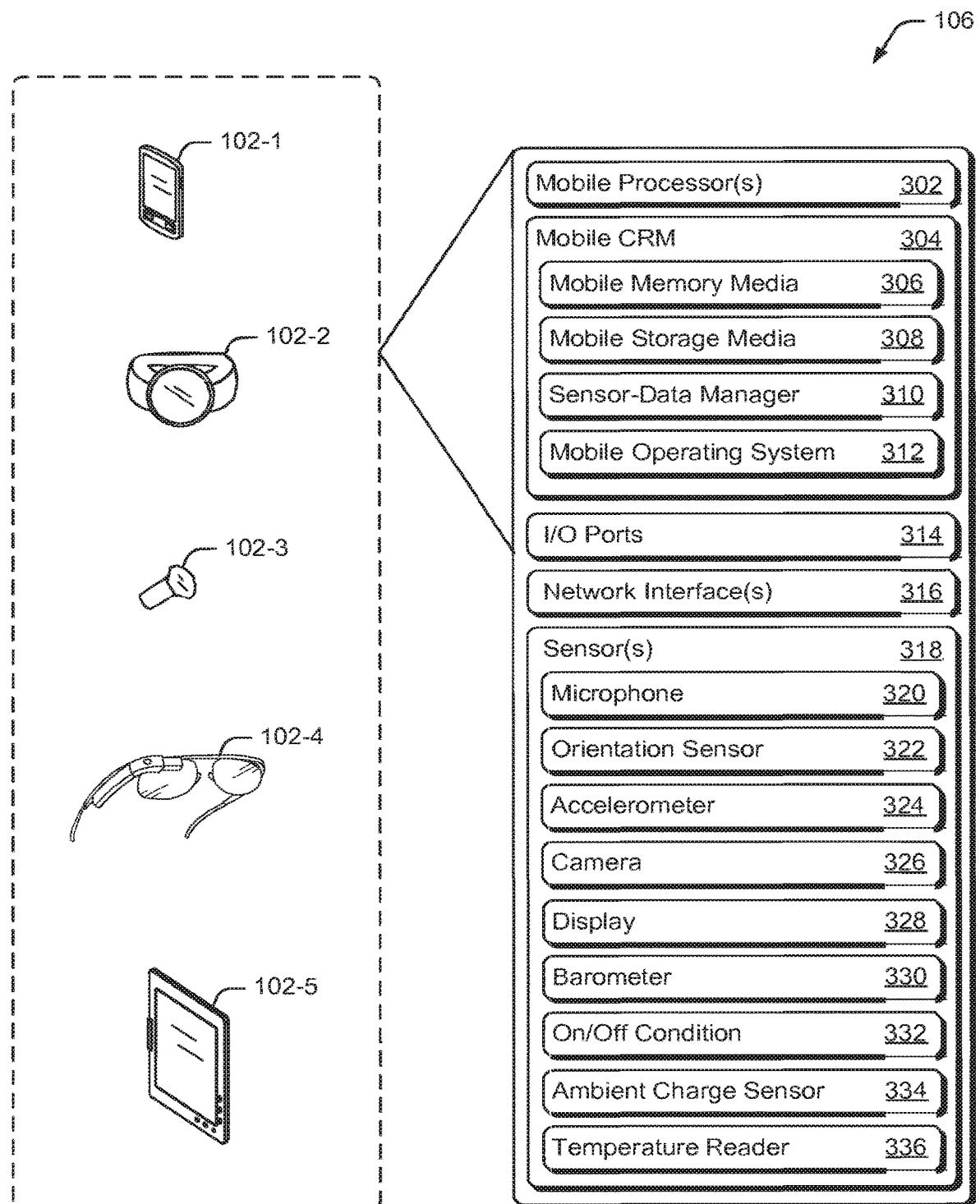
FIG. 3 illustrates a detailed example of one of the mobile devices of FIG. 1.

FIG. 3 illustrates a detailed example of mobile device 106, along with various examples of different types of mobiles devices. Mobile device 106 includes one or more mobile processors 302, mobile computer-readable storage media (mobile CRM) 304, mobile memory media 306, mobile storage media 308, sensor-data manager 310, and mobile operating system 312. Applications can be embodied as computer-readable instructions on memory media 206, which can be executed by processor(s) 202 to provide some or all of the functionalities described for computing device 102.

Sensor-data manager 310 is capable of recording, analyzing, tracking, and/or providing sensor data sensed by sensors 318 to forecaster 104. Sensor-data manager 310 may also or instead cause sensors 318 to record or otherwise sense sensor data. Thus, sensor-data manager 310 can cause a camera to take pictures of weather conditions, analyze the pictures to determine that some of the pictures indicate weather conditions (e.g., rain or clouds), and provide these pictures to forecaster 104. With appropriate metadata, such as a time taken and a location of mobile device 106, forecaster 104 may better forecast weather conditions with mobile-sensor data provided by sensor-data manager 310.

Mobile-sensor data 110 can explicitly indicate weather conditions, such as a barometer sensing a pressure change, a temperature reader sensing the temperature, a humidity sensor sensing humidity, or a camera sensing light intensity. Non-sensor data can also explicitly indicate weather conditions, such as a user selecting a button on an interface to indicate rain or wind. Much of mobile-sensor data 110 described herein, however, includes sensor data that is interpretable but does not explicitly indicate a weather condition. This interpretable sensor data includes, for example, an orientation of a mobile device. This orientation can be interpreted as a gesture or position, which in turn can be interpreted, based on historic user data, to indicate rain based on the gesture or position correlating to users holding umbrellas. Some mobile-sensor data 110 may seem to explicitly indicate weather conditions, but in practical terms is first interpreted, such as audio from a microphone that, absent interpretation, can be either wind or the microphone being rubbed against clothing Additional examples of explicit weather-related sensor data and interpretable weather-related sensor data are set forth below.

Mobile device 106 includes I/O ports 314, network interfaces(s) 316, and one or more sensors 318. I/O ports 314 enable interaction with other devices, media, or users. I/O ports 314 can include a variety of ports, such as high-definition multimedia (HDMI), digital video interface (DVI), display port, fiber-optic or light-based, audio ports (e.g., analog, optical, or digital), USB ports, serial advanced technology attachment (SATA) ports, peripheral component interconnect (PCI) express based ports or card slots, serial ports, parallel ports, or other legacy ports.

Network interface(s) 316 are capable of communicating sensor (and other) data over wired, wireless, or optical networks. Data communicated over such networks may include weather-related sensor data. By way of example, network interface 316 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Sensors 318 include one more sensors capable of sensing weather-related data, including: microphone 320; orientation sensor 322; accelerometer 324; camera 326; display 328; barometer 330; on/off condition 332; ambient charge sensor 334; and/or temperature reader 336. Each of various sensors 318 may sense conditions that may in turn be interpreted to determine weather conditions, and thus improve weather forecasting for a macro- or micro-location.

Consider, by way of example and not limitation, each of these sensors and examples of what they sense related to weather. Microphone 320 can sense sounds that are interpreted to indicate wind, thunder, rain, and being put in a pocket, possibly by the user to avoid getting the device wet.

Orientation sensor 322 can sense a user's gestures, such as holding up an umbrella, turning up or down a user's collar, zipping up a jacket, putting hands in a pocket, and the like, which can then be interpreted to indicate a weather condition (e.g., wind, cold, rain).

Accelerometer 324 can sense some of the gestures of the orientation sensor 322, as well as a user walking slowly, presumably because the weather is good (in some cases), running, which can be interpreted to indicate that someone is trying to get out of the rain, walking fast, often due to uncomfortable weather (rain, wind, snow, hail), and so forth.

Camera 326 can sense wind and rain through pictures (still or moving) of items being blown about, rain or snow or hail falling, an amount of ambient light (cloudy or sunny), particular clouds and data about those clouds (location, dark, light, raining, lightning, velocity), detailed bottom-up cloud images showing finer resolution and additional data to that of top-down images provided in satellite weather data 116, and so forth.

Some devices have cameras working much of the time, such as some smart glasses, and thus these can sense up-to-the-minute or up-to-the-second conditions. Sensor data received by camera 326 can be explicit or interpretable as noted.

Display 328 can sense interaction failures, which can be interpreted to be caused by the display being wet, or caused by a user trying to use gloves or with wet or cold (and thus less nimble) fingers, and so forth.

Barometer 330 can sense pressure and pressure changes, which not only indicate current conditions but can be used to predict a change in current conditions.

On/off condition 332 can be a sensor or some indicator that the user has turned on or off his or her mobile device 106, which may indicate that it is too cold, rainy, or windy for use of some devices, and so forth. For example, many people will not browse the internet on a smart phone in the rain or when it is so cold and windy as to require gloves (which also affects use of the device and can be sensed).

Ambient charge sensor 334 can sense electrical charge in the air, which may indicate a thunder storm, lightning, and other weather conditions. Sensor data from ambient charge sensor 334 is generally explicit weather-related sensor data, as it often indicates a weather condition without interpretation.

Temperature reader 336 can sense temperature and temperature changes, which are generally explicit sensor data. This discussion now turns to an example server computer having forecaster 104.

Figure 4:
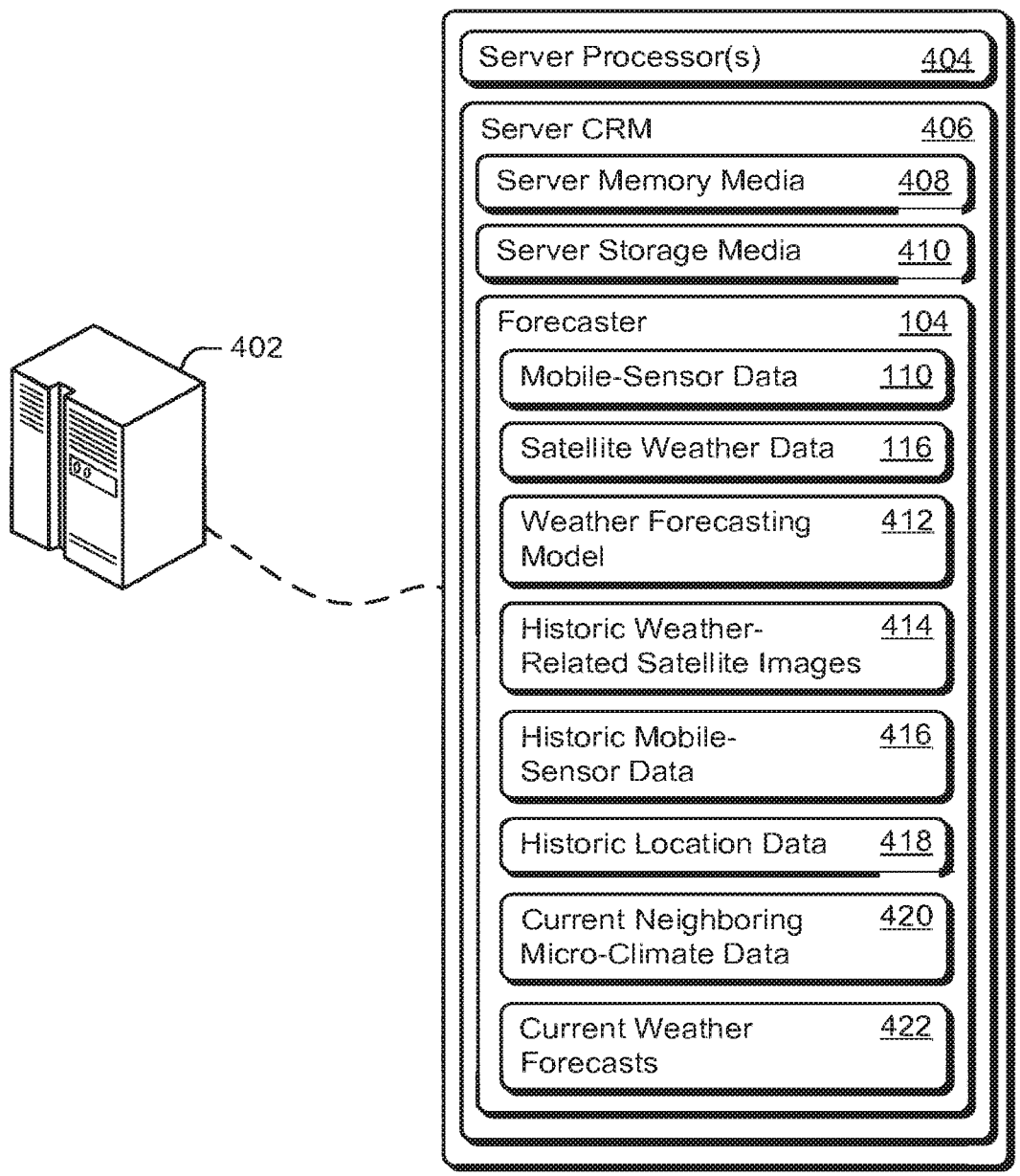
FIG. 4 illustrates a server computer having the forecaster of FIG. 1.

FIG. 4 illustrates a detailed example of a server computer 402 having forecaster 104. As noted above, forecaster 104 may be separate from, or integral with, computing device 102 of FIG. 1. In this example, sensor data 110 and satellite weather data 116 are received, at server computer 402, by forecaster 104 from sensor-data managers 310 of respective mobile devices 106 and data source 108 (as shown in FIG. 1). Forecaster 104 then forecasts micro-climates and/or improved weather conditions for macro-locations. Forecaster 104 may simply provide this information to news channels, such as television, radio, and satellite radio programs, to servers and other accessible entities (e.g., weather-related webpages), traditional weather-alert systems, and so forth, but may also provide forecasts directly to computing device 102, such as through a web-enabled resource, or in other manners known for providing data to computing devices.

Generally, server computer 402 includes server processor(s) 404 and server computer-readable media (server CRM) 406, which includes server memory media 408 and server storage media 410. Server computer-readable media 406 includes forecaster 104, which itself may include or have access to mobile-sensor data 110 and satellite weather data 116 as well as an weather-forecasting model 412, historic weather-related satellite images 414, historic mobile-sensor data 416, historic location data 418 for various micro-locations, current neighboring micro-climate data 420, and current weather forecasts 422. Note that the term "historic" when used in the context of data can include data that is old or recent but not current. Thus, historic weather-related satellite images 414, historic mobile-sensor data 416, and historic location data 418 can include data from as little as hours, minutes, or even seconds ago to even one hundred years ago.

Weather-forecasting model 412 correlates historic satellite weather data, such as weather-related satellite images 414, and historic mobile-sensor data 416. Weather-forecasting model 412 can be used to forecast weather conditions based on current mobile-sensor data 110 and current satellite weather data 108. Historic weather-related satellite images 414 and other historic satellite weather data and historic weather conditions can be those previously received by forecaster 104, or known or determined from various sources, such as news sources, government weather sources, local weather recordings, historic forecasts, and so forth. Historic mobile-sensor data 416 includes data about sensor data received from mobile devices, such as those from sensors 318 of mobile device 106 of FIG. 3.

In some cases, weather conditions for a macro-location or micro-climates for a micro-location can be forecast using current weather-related satellite images (e.g., of satellite weather data 116) based on weather-forecasting model 412.

As noted, weather-forecasting model 412 can be based on historic mobile-sensor data 416, but current weather conditions can be determined without current mobile-sensor data 110.

Figure 5:
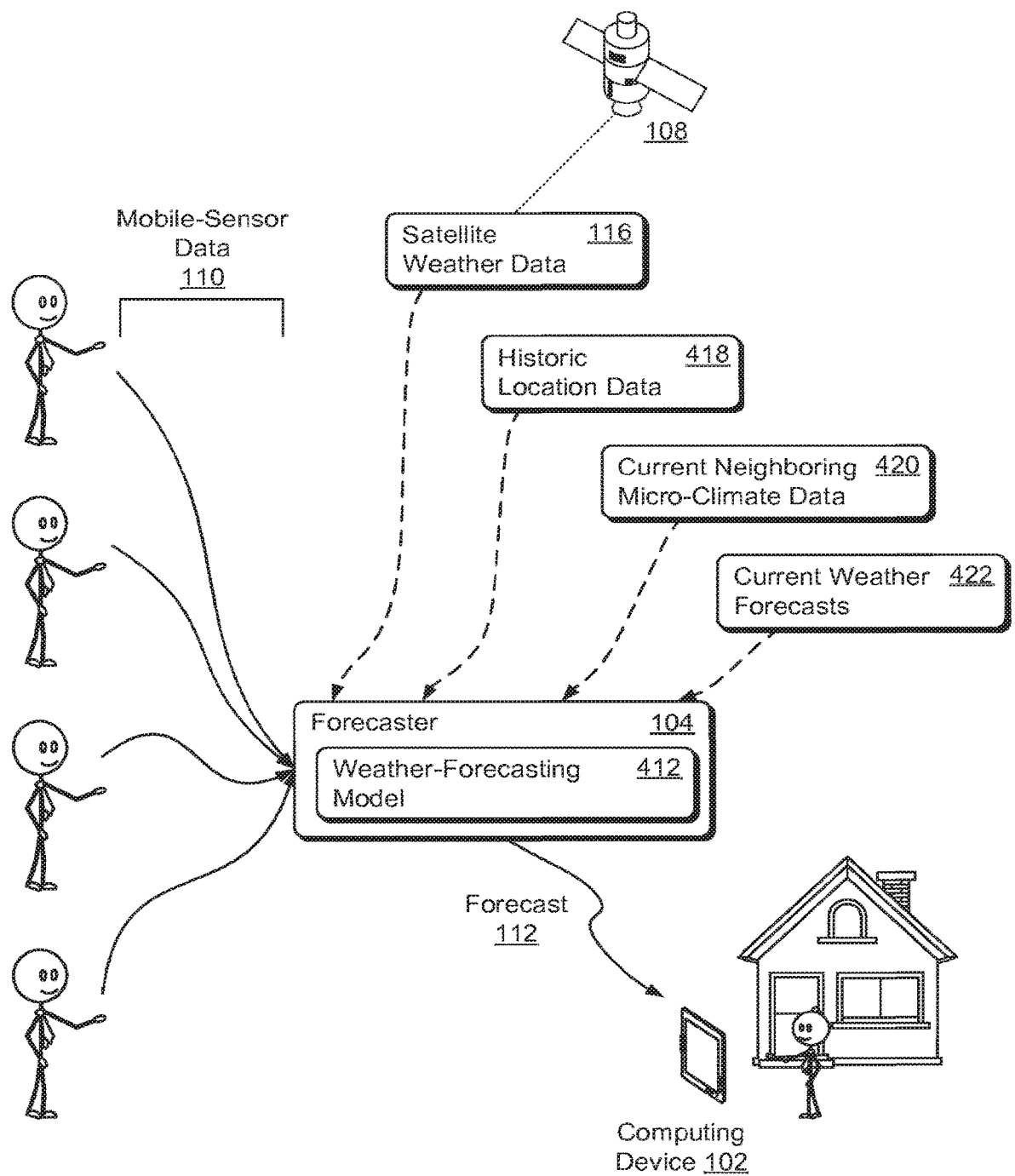
FIG. 5 illustrates alternative data sources usable to forecast weather conditions for a macro-location and/or micro-climates for micro-locations.

Mobile-sensor data 110 that is current can be used but is not required, as is historic location data 418, current neighboring micro-climate data 420, or current weather forecasts 422. Use of these alternative data sources to forecast weather conditions (for macro- or micro-locations) is illustrated in FIG. 5. Note that forecaster 104 includes weather-forecasting model 412 and receives satellite weather data 116, and can also receive current mobile-sensor data 110 from various mobile devices 106 associated with various users, as well as historic location data 418, current neighboring micro-climate data 420, and current weather forecasts 422. Using zero, one, or multiples of these data forecaster 104 forecasts weather conditions and provides this to various entities, such as to a user through computing device 102.

In more detail, historic location data 418 can be used as an aid in determining a micro-climate at a micro location. For example, when determining a current micro-climate for a micro-location, historic location data 418 for that micro-location may indicate a likelihood of various weather conditions. A particular street in New York City may commonly be windy, or be windier than other streets, or be windier than the weather forecast historically predicts. This can often be the case for micro-locations due to wind tunneling through buildings, hills, and so forth. Thus, forecaster 104 may augment or otherwise use this information to tailor a micro-climate determination. If, for example, without this historic location data 418 the techniques determine that the wind is highly likely to be between 15 and 20 miles per hour, the techniques may indicate the higher end of the likely range of 20 miles per hour as the current micro-climate.

As noted, current neighboring micro-climate data 420 may also be used. Assume, for example, that mobile-sensor data 110 is received from 48 people at a street or alley immediately adjacent or two blocks from, and roughly parallel to, the micro-location that includes the alleyway or street of interest. Assume also that mobile-sensor data 110 is received from only six people at the micro-location of interest. The neighboring micro-climate may be determined, based on the high number of users on that street, with a high degree of accuracy. With only six users on this street, however, a wide range of possible weather conditions may be possible based on the data received. If historic data indicates a strong correlation between the neighboring micro-location (the parallel street) forecaster 104 may use the micro-climate from the neighbor as an aid in determining the micro-climate on the desired street. Parallel streets, adjacent areas, and so forth can each be used, as can somewhat remote areas or streets if the historic correlations are strong. Thus, if a street two miles away has a strong correlation for wind with this street, it can be used as an aid in determining the wind of this street even though it is not geographically very close.

Further still, current weather forecasts 422 from other sources can be used by forecaster 104 to aid in providing an accurate forecast 112. Thus, if a weather-forecasting entity indicates a particular weather condition for a macro-location, this can be used by forecaster 104 as a data point in cases where the illustrated data sources are inconclusive or provide a range of possible weather conditions. If, for example, forecaster 104 forecasts weather conditions for a region in which a micro-location resides (e.g., a town in which a park resides) to be a cloudy day and forecaster 104 determines, absent a current weather forecast 422, that the park is likely to be either sunny or partly sunny, forecaster 104 may forecast a partly sunny micro-climate for the park based on the current weather forecast for the town indicating that the park is more likely to be partly sunny than sunny because the town's forecast is cloudy.

Example Methods

Figure 6:
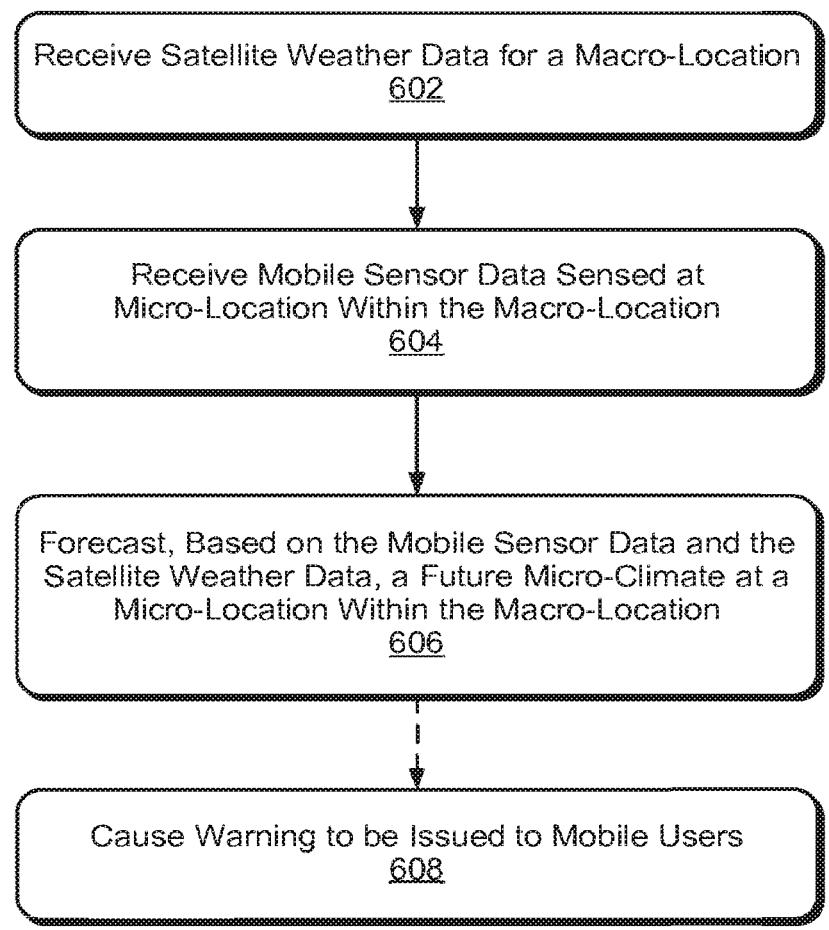
FIG. 6 illustrates an example method for weather forecasting using satellite data and mobile-sensor data from mobile devices.

FIG. 6 illustrates example methods 600 for weather forecasting using satellite data, and mobile-sensor data from mobile devices. The order in which blocks of these and other methods are illustrated is not intended to be construed as a limitation, and any number or combination of the blocks in these and other methods herein can be combined in any order to implement a method or an alternate method.

At block 602, satellite weather data is received for a macro-location that includes one or more micro-locations. This satellite weather data can include various current weather conditions as noted above. By way of example, consider a case where the satellite weather data includes a location of a cloud and the mobile-sensor data sensed by the mobile devices determinable to include information about the cloud. Thus, forecaster 104 has top-down and bottom-up images and other data on the cloud.

At block 604, mobile-sensor data is received from mobile devices. As noted, these mobile devices can be associated with users sensed by the mobile devices at one or multiples of the micro-locations within the macro-location. Examples of weather-related sensor data, mobiles devices, and micro-locations are described in detail in relation to FIGS. 1-5 above. Also, these methods 600 can be performed by forecaster 104, whether acting at server 402, computing device 102, or at one or more other locations, whether in whole or in part.

At block 606, a future micro-climate for one of the micro-locations within the macro-location is forecast based on the mobile-sensor data and the satellite weather data. As noted, forecasting can be based on comparing the relationship between the location of the cloud and the information about the cloud and historic relationship data between prior locations of prior clouds and prior information about the prior clouds from prior-received mobile-sensor data. Thus, forecasting a micro-climate can also be based on a prior micro-climate historical model for the micro-climate. Other historic data can be used (See FIGS. 4 and 5), such as historic location data for the micro-locations. Use of historic data is covered in greater detail as part of method 700.

Returning to the example of top-down and bottom-up information on a cloud, forecaster 104 may forecast a micro-climate based on a relationship between mobile-sensor data indicating, at one micro-location, that the cloud is drizzling rain, and a speed and direction of that same cloud indicated in the satellite weather data. With this information, another micro-location that is within the projected path of the cloud will be determined to be about to have drizzling rain.

Optionally, method 600 may proceed to block 608, where a warning is caused to be issued to mobile users. These can be the same or different users from which mobile-sensor data is received. Continuing the example of the particular cloud, forecaster 104 may warn of adverse weather, through climate interface 210 of computing device 102 (of FIGS. 1 and 2). This warning can be sent to a computing device 102 known to be in a micro-location within the projected path of the cloud, and thus that it is about to drizzle.

Note that weather conditions at one micro-location can be forecast based on mobile-sensor data from that micro-location and/or other micro-locations within the macro-location. Thus, mobile-sensor data from neighboring micro-locations can be used to forecast micro-climates for another micro-location, or both can be used, or simply that of the micro-location for itself In more detail, forecaster 104 may forecast micro-climates based on satellite weather data 116 and mobile-sensor data 110 that, in some cases, is updated minute-by-minute or even second-by-second. Thus, a forecasted micro-climate can be accurate within even seconds of the weather conditions sensed at a micro-location (neighboring or not). In some cases a forecasted micro-climate is based on sensor data received over the last five or ten minutes or even longer, such as in cases where a number of mobile devices providing weather-related sensor data is limited.

Forecaster 104 may forecast a micro-climate using statistical analysis, such as a likelihood that a windy and rainy street will still be windy and rainy in ten minutes, for example. Forecaster 104 may also rely on multi-time micro-climates for neighboring micro-locations. Consider, for example, multi-time micro-climates for two micro-locations fairly near to a current micro-location of interest. Assume that forecaster 104 has received information from mobile devices 106 indicating that rain started at $42^{nd}$ street ten minutes ago and ended at $42^{nd}$ street five minutes ago, started five minutes ago at $48^{th}$ street and just ended at $48^{th}$ street, and thus at the current micro-location of interest of $52^{nd}$ street, where it is currently raining, that it will likely end four minutes from now. Similarly, forecaster 104 may determine that a micro-rain pattern is moving north-northwest at two miles-per-hour and lasts for about six minutes at it moves through various streets. Forecaster 104 may also or instead base this movement using satellite weather data 116, which can provide location, speed, and so forth for clouds and weather patterns.

Figure 7:
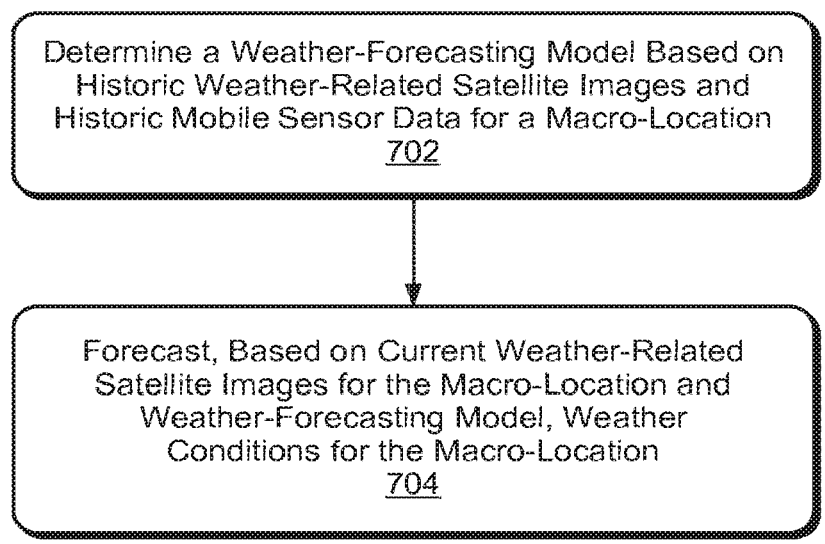
FIG. 7 illustrates an example method for determining and using an historic model to forecast weather conditions.

FIG. 7 illustrates an example method 700 for determining and using an historic model to forecast weather conditions.

At block 702, a weather-forecasting model is determined based on historic weather-related satellite images or other satellite weather data for a macro-location and historic mobile-sensor data sensed by mobile devices within the macro-location. For example, forecaster 104 may determine weather forecasting model 412 of FIG. 4 based on historic weather-related satellite images 414, historic mobile-sensor data 416, and historic location data 418. Consider, for example, a case where an historic weather-related satellite image includes top-down cloud images and historic mobile-sensor data includes bottom-up cloud images. In such a case, a finer resolution for weather patterning for the top-down cloud images based on the bottom-up cloud images can be used in determining the model. A particular image of a cloud from a satellite can be correlated to conditions beneath that cloud that has a high degree of resolution, as it is from mobile-sensor data. Therefore, future similar images of a current cloud can be modeled as likely to create certain weather conditions on the ground based on historic mobile-sensor data, even if current mobile-sensor data is not available.

In more detail, this historic mobile-sensor data can include indications of rain (e.g., how heavy, steady or varying, including wind or falling straight down) such that the weather-forecasting model correlates particular types of satellite images with rain of this type.

Note that this determination of weather forecasting model 412 can provide a model for micro-locations based on macro-location historic data or the reverse. Thus, in some cases the historic mobile-sensor data is received from multiple micro-locations within the macro-location and determining the weather-forecasting model predicts weather for the macro-location in addition to the multiple micro-locations. Alternatively or in addition, the historic mobile-sensor data is received from a micro-location within the macro-location and determining the weather-forecasting model predicts micro-climates differently at the micro-location than some other portion of the macro-location.

At block 704, weather conditions for the macro-location forecasting are forecast based on current weather-related satellite images or other satellite data for the macro-location and the weather-forecasting model. As illustrated in FIG. 5, other data, such as current mobile-sensor data 110 can be used as well.

Ways in which the historic model correlates weather with sensor data can vary based on regions, micro-locations, and even cultures in which the sensor data is received. Thus, the techniques may correlate historic weather conditions for a macro-location to historic satellite data and mobile-sensor data sensed by mobile devices at micro-locations within the macro-location. The historic model can be used to predict micro-climates at the micro-locations within the macro-locations.

Consider, for example, differences in how people in one city may react to weather, which affects how weather-related sensor data is analyzed and correlated. In Seattle, Wash. (in the USA), for example, many people surprisingly do not use umbrellas or walk faster in the rain. This may be counter-intuitive, but it rarely rains heavily in Seattle and it rains lightly so often that many people are used to it (or have given up fighting it) and thus continue on without altering their behavior. A light rain falling in La Serena, Chile, which receives rain about once a year, however, may instead alter peoples' behavior, as they are not used to rain.

Similarly, some cultures affect how people react to weather. Thus, the techniques may correlate historic weather conditions of a people group to historic weather-related sensor data sensed by mobile devices associated with users of that people group to more accurately determine micro-climates. Consider cultures, for example, where people generally wear hats or other head coverings very nearly all of the time. In such cases, people are less likely to alter their behavior for light rain but may be more likely to alter their behavior for wind (e.g., with gestures to hold their hats on so they do no blow away). These regional and cultural differences are but two examples of ways in which the techniques may address and improve the accuracy of weather forecasting model 412.

Figure 8:
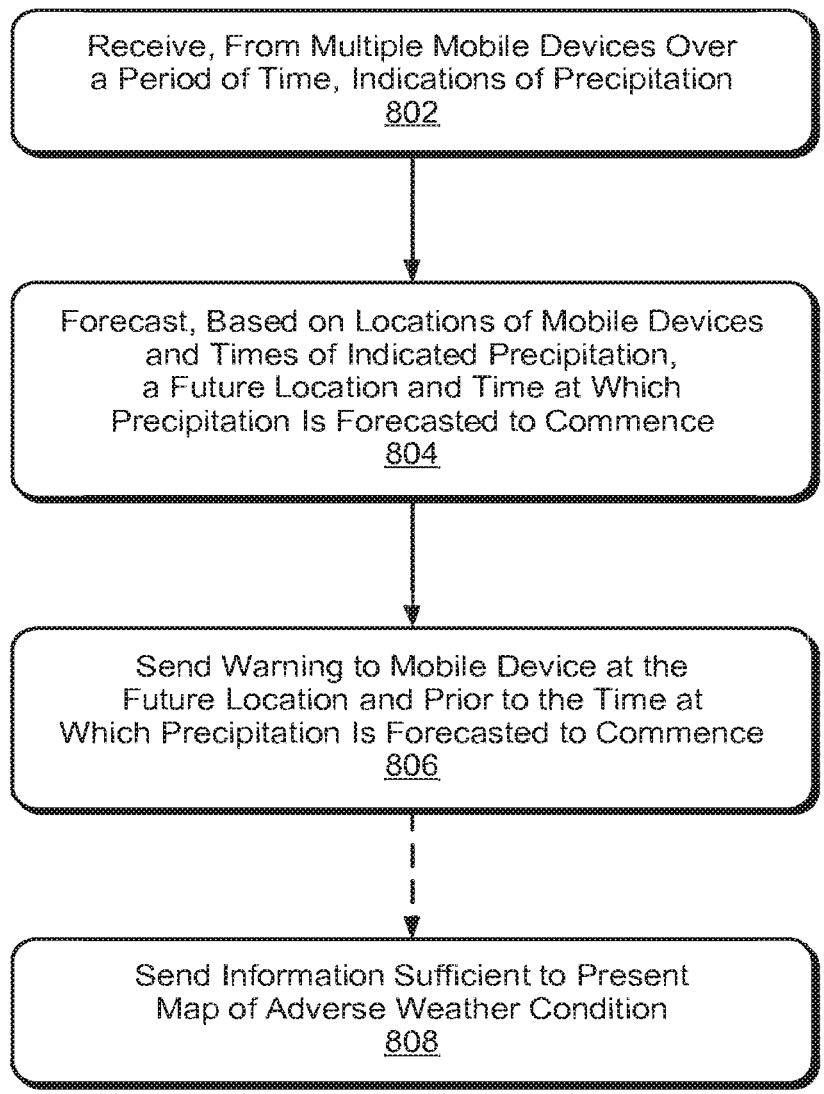
FIG. 8 illustrates an example method for warning or otherwise informing users of forecasted weather conditions.

FIG. 8 illustrates an example method 800 for warning or otherwise informing users of forecasted weather conditions.

At block 802, indications of an adverse weather condition occurring or commencing are received from satellite weather data and/or multiple mobile devices and over a timespan.

At block 804, a future location and time at which an adverse weather condition is forecasted to commence is forecast based on locations of the multiple mobile devices and times at which the multiple mobile devices indicated the adverse weather condition or the satellite weather data indicated the adverse weather condition. This determination of the future location can be based on a speed and direction of a weather condition causing the adverse weather condition, which may be based on mobile-sensor data or on a speed and direction based on satellite image data for the weather condition.

At block 806, a warning or other information is sent to one or more other mobile devices at the future location and prior to the time at which the adverse weather condition is forecasted to commence. Forecaster 104 and/or climate interface 210 may determine to forego the warning if sensor data indicates that the adverse weather has already commenced and the user is in the adverse weather (e.g., based on sensor data from sensor 318 of mobile device 106 when the user receives the warning through mobile device 106). Forecaster 104 similarly may send the warning responsive to determining, from sensor data of the one or more other mobile devices at the future location, that there is no current adverse weather condition at the future location. This warning can come in many forms, such as a shaking of a mobile device, a particular sound or other indicator, a flashing of a user interface display or camera flash, and so forth.

Method 800 may optionally continue to block 808, at which point forecaster 104 may send information sufficient for climate interface 210 to present a map of the adverse weather condition.

Figure 9:
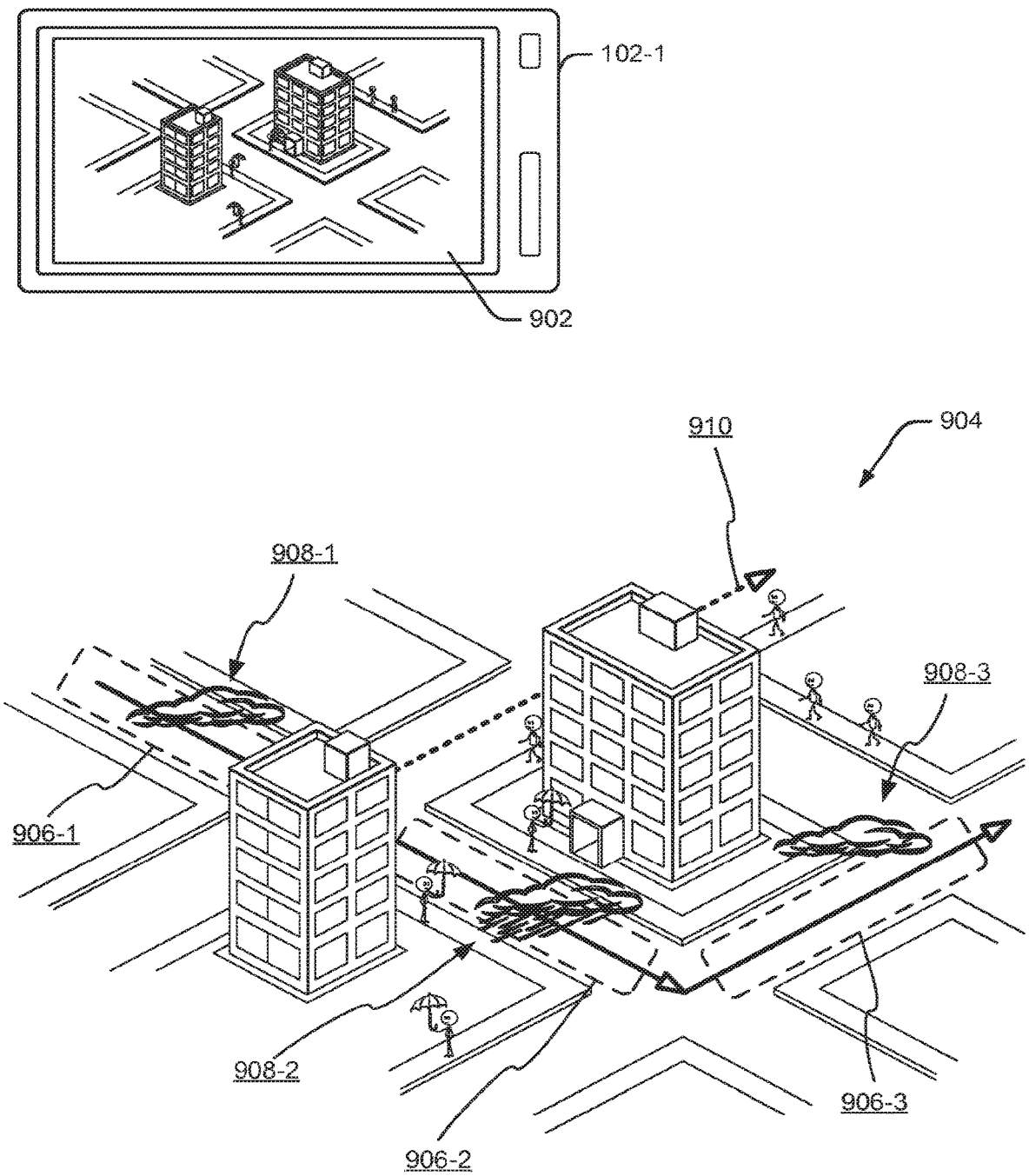
FIG. 9 illustrates a climate interface on a smart phone having a map showing micro-climates.

By way of example, consider FIG. 9, which illustrates climate interface 902 shown on smart phone 102-1 of FIG. 2. Climate interface 902 presents a map 904 having micro-locations 906 (shown at 906-1, 906-2, and 906-3) and respective forecasted micro-climates 908 (shown at 908-1, 908-2, and 908-3) for these micro-locations. Climate interface 902 may provide a path by which to avoid, as much as is practical, the adverse weather condition if climate interface 902 is aware of the user's destination (e.g., computing device 102 includes information sufficient to determine a desired or likely end point for the user, such as his place of work, a subway entrance, or a restaurant at which he has reservations in 20 minutes). This path is shown at path 910, which avoids adverse weather of forecasted micro-climates 908-2 and 908-3 for micro-locations 906-2 and 906-3, respectively.

Example Device

Figure 10:
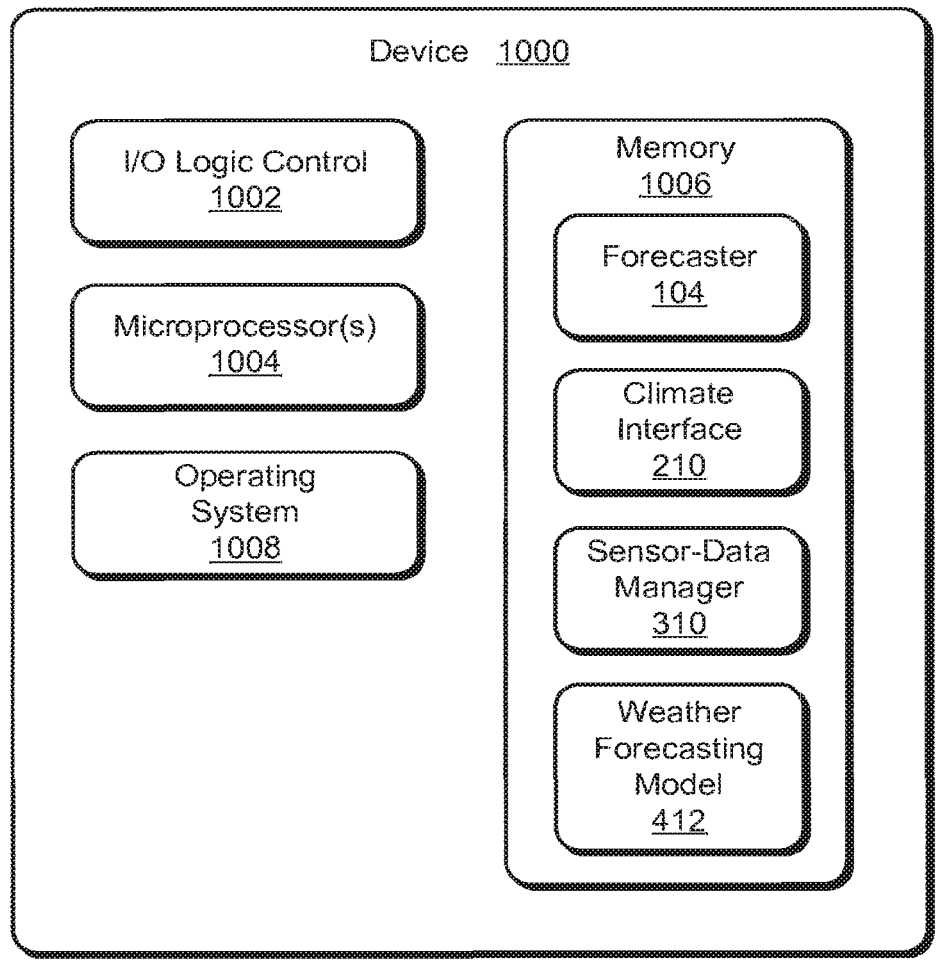
FIG. 10 illustrates various components of an example device that can implement techniques for weather forecasting using satellite data and mobile-sensor data from mobile devices, as well as other techniques described herein.

FIG. 10 illustrates various components of an example device 1000 having forecaster 104, climate interface 210, sensor-data manager 310, and/or weather forecasting model 412. These components are implemented in hardware, firmware, and/or software and as described with reference to any of the previous FIGS. 1-9.

Example device 1000 can be implemented in a fixed or mobile device being one or a combination of a media device, computing device (e.g., computing device 102, mobile device 106, and/or server 402 of FIGS. 1-4), television set-top box, video processing and/or rendering device, appliance device, a closed-and-sealed computing resource (such as some digital video recorders or global-positioning-satellite devices,), gaming device, electronic device, vehicle, and/or workstation.

Example device 1000 can be integrated with electronic circuitry, a microprocessor, memory, input-output (I/O) logic control, communication interfaces and components, other hardware, firmware, and/or software needed to run an entire device. Example device 1000 can also include an integrated data bus (not shown) that couples the various components of the computing device for data communication between the components.

Example device 1000 includes various components such as an input-output (I/O) logic control 1002 (e.g., to include electronic circuitry) and microprocessor(s) 1004 (e.g., microcontroller or digital signal processor). Example device 1000 also includes a memory 1006, which can be any type of random access memory (RAM), a low-latency nonvolatile memory (e.g., flash memory), read only memory (ROM), and/or other suitable electronic data storage. Memory 1006 includes or has access to one or more of forecaster 104, climate interface 210, sensor-data manager 310, or weather forecasting model 412.

Example device 1000 can also include various firmware and/or software, such as an operating system 1008, which, along with other components, can be computer-executable instructions maintained by memory 1006 and executed by microprocessor 1004. Example device 1000 can also include other various communication interfaces and components, wireless LAN (WLAN) or wireless PAN (WPAN) components, other hardware, firmware, and/or software.

Other example capabilities and functions of these managers, modules, models, and interfaces are described with reference to elements shown in FIGS. 1-4. These components, either independently or in combination with other entities, can be implemented as computer-executable instructions maintained by memory 1006 and executed by microprocessor 1004 to implement various embodiments and/or features described herein. Alternatively or additionally, any or all of these components can be implemented as hardware, firmware, fixed logic circuitry, or any combination thereof that is implemented in connection with the I/O logic control 1002 and/or other signal processing and control circuits of example device 1000. Furthermore, some of these components may act separate from device 1000, such as when remote (e.g., cloud-based) entities perform services for forecaster 104 or climate interface 210.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. An apparatus comprising:
   one or more computer processors; and
   one or more non-transitory computer-readable storage media having instructions stored thereon that, responsive to execution by the one or more computer processors, perform operations comprising:
   receiving weather data for a macro-location, the macro-location including a first micro-location and a second micro-location, the weather data including a forecast for the macro-location, the forecast for the macro-location being the same for the first micro-location and the second micro-location;
   receiving mobile-sensor data from mobile devices associated with users, the mobile-sensor data sensed by the mobile devices at the first micro-location included within the macro-location; and
   forecasting, based on the mobile-sensor data received from the mobile devices of the users located within the first micro-location and the forecast for the macro location included in the weather data, a future micro-climate for the first micro-location and a future micro-climate for the second micro-location, the forecasting predicting the future micro-climate of the second micro-location differently than the future micro-climate of the first micro-location and differently than the forecast for the macro-location.

2. The apparatus of claim 1, wherein the weather data further comprises information about a location of a cloud and information about the cloud and wherein forecasting the future micro-climate of the first micro-location or the future micro-climate of the second micro-location is based on a relationship between the location of the cloud and the information about the cloud.

3. The apparatus of claim 2, wherein the forecasting the future micro-climate of the first micro-location or the future micro-climate of the second micro-location is further based on comparing the relationship between the location of the cloud and the information about the cloud and historic relationship data between prior locations of prior clouds and prior information about the prior clouds from prior-received mobile-sensor data or prior weather data.

4. The apparatus of claim 1, wherein the receiving the mobile-sensor data receives first mobile-sensor data sensed by the mobile devices at the first micro-location and second mobile-sensor data sensed by the mobile devices at the second micro-location and wherein the forecasting is based on the first mobile-sensor data and the second mobile-sensor data.

5. The apparatus of claim 1, wherein the receiving the mobile-sensor data receives second mobile-sensor data sensed by the mobile devices at the second micro-location and the forecasting forecasts the future micro-climate of the first micro-location.

6. The apparatus of claim 1, wherein:
the mobile-sensor data includes one or more of: an audio recording of a microphone of one of the mobile devices; an orientation of one of the mobile devices; a movement read by an accelerometer of one of the mobile devices; an image or video recording of a camera of one of the mobile devices; an on or off condition of one of the mobile devices; or an effectiveness of a touch screen of one of the mobile devices; and
the weather data comprises a satellite image.

7. The apparatus of claim 1, wherein forecasting the future micro-climate of the first micro-location or the future micro-climate of the second micro-location is further based on a prior micro-climate historical model for the first micro-location or the second micro-location.

8. The apparatus of claim 1, wherein the first micro-location is a street or alleyway and the second micro-location is another street or alleyway immediately adjacent or within two streets of the first micro-location.

9. The apparatus of claim 1, wherein the forecasting the future micro-climate of the first micro-location or the future micro-climate of the second micro-location is further based on historic location data for the first micro-location or the second micro-location, the historic location data indicating a likelihood of various weather conditions.

10. The apparatus of claim 1, further comprising, responsive to determining that the future micro-climate of the first micro-location or the future micro-climate of the second micro-location includes adverse weather, causing a warning to be issued to one or more mobile devices in the first micro-location or the second micro-location.

11. The apparatus of claim 1, wherein the mobile-sensor data sensed by the mobile devices at the first micro-location includes information about a cloud.

12. The apparatus of claim 1, the operations further comprising generating a suggested travel route based on the future micro-climate of the first micro-location or the future micro-climate of the second micro-location.

13. The apparatus of claim 1, the operations further comprising modifying a travel route based on the future micro-climate of the first micro-location or the future micro-climate of the second micro-location.

14. The apparatus of claim 1, the operations further comprising updating the forecast for the macro-location based on the mobile-sensor data sensed by the mobile devices at the first micro-location, the future micro-climate of the first micro-location, or the future micro-climate of the second micro-location.

15. A computer-implemented method comprising:
determining a weather-forecasting model, the weather forecasting model based on:
historic weather-related data for a macro-location; and
historic mobile-sensor data sensed by mobile devices within the macro-location, the historic mobile-sensor data including at least some data received from a micro-location within the macro-location; and
forecasting, based on current weather-related data for the macro-location and the weather-forecasting model, weather conditions for the macro-location, the micro-location within the macro-location, and at least one other micro-location within the macro-location, the forecasting predicting micro-weather conditions differently at the micro-location than other micro-weather conditions at the other micro-location within the macro-location.

16. The method of claim 15, wherein at least some of the historic mobile-sensor data is received from multiple micro-locations within the macro-location and determining the weather-forecasting model further comprises predicting weather for the macro-location in addition to the multiple micro-locations.

17. The method of claim 15, wherein:
the historic mobile-sensor data includes one or more of: an audio recording of a microphone of one of the mobile devices; an orientation of one of the mobile devices; a movement read by an accelerometer of one of the mobile devices; an image or video recording of a camera of one of the mobile devices; an on or off condition of one of the mobile devices; or an effectiveness of a touch screen of one of the mobile devices;
the historic weather-related data comprises a first satellite image; and
the current weather-related data comprises a second satellite image.

18. A method comprising:
determining a weather-forecasting model:
the weather-forecasting model based on:
historic weather-related data for a macro-location; and
historic mobile-sensor data sensed by mobile devices within the macro-location; and
the weather forecasting model determined by:
determining weather patterning for the historic weather-related data based on the historic mobile-sensor data; and
correlating particular types of historic weather-related data with particular types of weather; and
forecasting, based on current weather-related data for the macro-location and the weather-forecasting model, weather conditions for the macro-location.

19. The method of claim 18, wherein:
the historic mobile-sensor data includes one or more of: a bottom-up cloud image, an indication of rain, an audio recording of a microphone of one of the mobile devices; an orientation of one of the mobile devices; a movement read by an accelerometer of one of the mobile devices; an image or video recording of a camera of one of the mobile devices; an on or off condition of one of the mobile devices; or an effectiveness of a touch screen of one of the mobile devices;
the historic weather-related data comprises a first satellite image; and
the current weather-related data comprises a second satellite image.

20. The method of claim 18, wherein the operations further comprise:
  receiving current mobile-sensor data sensed by the mobile devices at a first micro-location within the macro-location or a second micro-location within the macro-location; and
  updating the forecasting for the macro-location based on the received current mobile-sensor data sensed by the mobile devices.

\* \* \* \* \*